United States Patent [19]

Braden et al.

[11] Patent Number: 5,021,167

[45] Date of Patent: * Jun. 4, 1991

[54] METHOD FOR SEPARATING LIQUID FROM WATER USING AMINE CONTAINING POLYMERS

[75] Inventors: Michael L. Braden; Stephan J. Allenson, both of Richmond, Tex.

[73] Assignee: Nalco Chemical Company, Naperville, Ill.

[*] Notice: The portion of the term of this patent subsequent to Jun. 5, 2007 has been disclaimed.

[21] Appl. No.: 377,880

[22] Filed: Jul. 10, 1989

[51] Int. Cl.$^5$ .............................................. B01D 17/04
[52] U.S. Cl. .................................... 210/708; 210/734; 210/735; 252/341; 252/344
[58] Field of Search ............... 210/708, 728, 733, 734, 210/735; 252/341, 344

[56] References Cited

U.S. PATENT DOCUMENTS

| | | | |
|---|---|---|---|
| 3,493,501 | 2/1970 | Eck | 210/735 |
| 4,238,330 | 12/1980 | Fong et al. | 210/708 |
| 4,318,956 | 3/1982 | Stevens et al. | 428/265 |
| 4,396,752 | 8/1983 | Cabestary et al. | 210/734 |
| 4,628,078 | 12/1986 | Glover et al. | 210/734 |
| 4,734,205 | 3/1988 | Jacques et al. | 210/734 |

FOREIGN PATENT DOCUMENTS

| | | | |
|---|---|---|---|
| 68955 | 1/1983 | European Pat. Off. | 210/734 |
| 201237 | 11/1986 | European Pat. Off. | 210/734 |

OTHER PUBLICATIONS

"The HLB System a Time Saving Guide to Emulsifier Selection", ICI Americas, Inc. 1980, Mar.

Primary Examiner—Peter Hruskoci
Assistant Examiner—Krisanne Shideler
Attorney, Agent, or Firm—Donald G. Epple

[57] ABSTRACT

A method is disclosed for clarifying water comprising dosing the water to be clarified with a copolymer produced by the emulsion polymerization of only hydrophobic monomers where at least one hydrophobic monomer is an amine containing monomer which is hydrophobic when the amine is neutral and hydrophilic when the amine is salified.

11 Claims, No Drawings

METHOD FOR SEPARATING LIQUID FROM WATER USING AMINE CONTAINING POLYMERS

FIELD OF THE INVENTION

The invention is in the field of liquid/liquids separation. More particularly, the invention relates to clarifying oil-in-water dispersion.

BACKGROUND OF THE INVENTION

In oil fields, it is very common to find oil dispersed in water. This occurs during steam flooding, water flooding or other oil recovery procedures in which the oil is mixed with water.

Dispersion also occurs in water in the vicinity of the oil well.

An oil-in-water dispersion is difficult to distinguish from an oil-in-water emulsion.

In an oil-in-water emulsion, the water contains a sufficient level of surfactants or emulsifying agents. The surfactants may either be natural occurring or man-made. Oil-wet solids also play a role in stabilizing the emulsions. The solids sterically inhibit the oil droplets from coalescing. The oil-in-water emulsion has an extremely long retention time.

In an oil-in-water dispersion, the water does not contain enough emulsifying agents to form an emulsion. The oil droplets are usually small and may contain solid particles which give them slight stability. Upon standing, the dispersed oil will rise to the top of the water layer and coalesce.

The problem of oil-in-water dispersions is a significant problem. Generally, water used during oil recovery must be sent to waste treatment facilities, retention ponds, or other water forces. It is not acceptable to return this waste water or the water dispersed therein. Because of the small size of the oil droplets, mechanical separation cannot reasonably be accomplished by merely waiting for the oil droplets to coalesce and separate from the water. Some form of intervention must occur. That intervention preferably, will result in rapid phase separation.

SUMMARY OF INVENTION

The inventors have found that this water clarification can be rapidly brought about using a polymer which they have produced by the emulsion polymerization of hydrophobic monomer in a water external latex.

In one embodiment of the invention, where only one hydrophobic monomer is utilized, that hydrophobic monomer must be an amine containing monomer which is hydrophobic when the amine is neutral and hydrophilic when the amine is salified.

In another embodiment of the invention where more than one hydrophobic monomer is utilized, at least one of the hydrophobic monomers must contain an amine which is hydrophobic when the amine is neutral and hydrophilic when the amine is salified.

The amine containing polymer is added to the water being treated. When added to the water of this invention, it becomes salified and solubilized in the water.

The polymers produced by this method generally have a molecular weight of at least two million. The particle size of the polymer will fall generally within the range of 0.05 to 5.0 microns; although a particle size of approximately 0.1 to 0.2 is most preferred.

These polymers are further characterized as containing at least 30% hydrophobic amine containing monomer. Most preferably, the polymer will contain at least 40% hydrophobic amine containing polymer.

Generally, the polymer will be added to the system as a latex. However, it is possible to first dissolve the polymer in water and feed the polymer to the system as a solution polymer.

The polymer will remain in the emulsion form as long as the effective pH of the polymer in the oil phase of the emulsion is greater than 8. It is understood that the pH of an oil phase cannot be directly taken. However, if the system is inverted, and the pH taken, the resultant pH will be approximately 8 or greater.

That is, if the polymer is to remain in emulsion form, it is important that the pH of the water phase remain at or above approximately pH 7. If the pH of the water phase falls below approximately pH 7, the hydrophobic polymer will become salified. Once salified, the polymer will commence dissolving in water, and the emulsion will break.

The emulsion will break when added to water to be treated because of dilution of the continuous phase. The pkb for the salified amine is such that salification will occur upon dilution with water. As salification continues, the polymer becomes less and less coiled. The salified polymer becomes more extended as it becomes increasingly more charged. The salified polymer thus becomes available for disrupting the liquid/liquid interface of an oil-in-water dispersion for effectuating liquid/liquid separation.

THE POLYMERS

The polymers are produced by the emulsion polymerization of hydrophobic monomer in a water external latex. The polymer must include an amine containing monomer which is hydrophobic when the amine is neutral and hydrophilic when the amine reacts with acid to form an amine salt, (i.e. when the amine is salified). Such amine containing monomers can be ascertained by those skilled in the art. Included among the suitable monomers are dimethylaminoethyl methacrylate, dimethylaminopropyl methacrylamide, diallylamine, diethylaminoethyl methacrylate, dimethylaminoethyl acrylate, diethylaminoethyl acrylate and N,N-diallylcyclohexylamine, The polymers can also include non-amine containing hydrophobic monomers. Such monomers can be ascertained by one skilled in the art without undue experimentation. Included among the suitable hydrophobic monomers are butyl acrylate, ethyl acrylate, methyl methacrylate, lauryl acrylate, stearic methacrylate and styrene.

THE EMULSIFIERS

Emulsifiers (including emulsifier mixtures) suitable for performing oil-in-water emulsions can be used in preparing the polymers of this invention, or in preparing a latex containing those polymers. Such emulsifiers generally have an HLB greater than 8 and most preferably have an HLB within the range of 8 to 18 Suitable emulsifiers can readily be determined by those skilled in the art. The term HLB and the method of determining suitable emulsifiers are discussed in the March 1980 ICI Americas Inc. publication entitled "The HLB System a Time Saving Guide to Emulsifier Selection."

THE INITIATORS

Initiators for emulsion polymerization are well known and suitable initiators for preparing the polymers of the invention can be readily ascertained by those skilled in the art. Thermal and/or redox initiators are most preferred. But other types of initiators can be used.

PREPARATION OF THE POLYMERS

PROCEDURE A

Below is a typical emulsion polymerization procedure using AMP as the catalyst.

| | Materials Needed | Percentage |
|---|---|---|
| A. | Water | 76.36 |
| | Triton X-405 | 1.71 |
| | Sodium Lauryl Sulfate | 0.93 |
| B. | DMAEM (45 mole %) | 11.33 |
| | Ethylacrylate (27.5 mole %) | 4.33 |
| | Methyl methacrylate (27.5 mole %) | 4.34 |
| C. | Ammonium persulfate (10% in water) | 0.33 |
| D. | Sodium meta-bisulfite (5% in water) | 0.67 |

1. Charged items listed in (A) to a 500 ml round bottom flask equipped with an overhead stirrer, nitrogen purge, and thermometer.
2. Started moderate stirring at moderate speed.
3. To a separate beaker, combined items listed in (B).
4. Added CONTENTS in beaker to flask. A milky white mixture resulted.
5. Started nitrogen purge. (Caution! Foaming will occur if the flow rate of the nitrogen gas is too high.)
6. Heated to 30 degrees C.
7. Added (C). Stir for 15 seconds.
8. Added (D).

Temperature began to rise five minutes after the addition of (D). Temperature reached a maximum of 50 degrees C.

9. Stirred for 4 hours.
10. Transferred finished product to a storage container.

The product was a milky white latex with a bluish cast and did not settle out. Tests for residual DMAEM and acrylate monomers proved negative.

PROCEDURE B

The following emulsion polymerization procedure was used when Vazo 67 catalyst was used to initiate the reaction.

| | Materials Needed | Percentage |
|---|---|---|
| A. | Water | 76.36 |
| | Triton-405 | 1.71 |
| | Sodium Lauryl Sulfate | 0.93 |
| | Vazo 67 | 0.01 |
| B. | DMAEM (45 mole %) | 11.33 |
| | Ethylacrylate (27.5 mole %) | 4.33 |
| | Methyl methacrylate (27.5 mole %) | 4.34 |

1. Charged items listed in (A) to a 500 ml round bottom flask equipped with an overhead stirrer, nitrogen purge, addition funnel, reflux condenser, and thermometer.
2. Started moderate stirring.
3. Started nitrogen purge. (CAUTION! Foaming will occur if the flow rate of the nitrogen gas is too high.)
4. Heated to 60 degrees C.
5. Added to the addition funnel items listed in (B). over a three hour period.
7. After addition, continued heating for 1 hour at 60 degrees C.
8. Cooled.
9. Transferred finished product to a storage Vazo 67 is a trademark of the Dow Chemical Company for a free radical initiator.

The product was a milky white latex with a bluish cast and did not settle out. Tests for residual DMAEM, ethyl acrylate and methyl methacrylic proved negative.

The molecular weight of the cationic water external latex polymers made from ethylacrylate, methyl methacrylate and dimethylaminoethyl methacrylate was around 2.5 million. The average approximately 0.15 microns. The viscosity of the product was 5 cps measured on a Brookfield viscometer with a #1 spindle, @30 rpm at 25 degrees F. The product had a pH within the range of 8 to 9. Upon lowering the pH to 3 with ten percent hydrochloric acid, the product became clear and highly viscous.

U.S. Pat. No. 4,318,956, by Rohm and Haas Company, which teaches another procedure for making water external latex polymers and is hereby incorporated by reference.

LIST OF POLYMERS TESTED

The polymers tested show that hydrophobic polymer having from 30–100 mole percent amines work well. The following amines were prepared according to emulsion Procedures A or B described and were evaluated in the oil-in-water emulsion form, unless otherwise indicated:

| List of Polymers Tested | | |
|---|---|---|
| A 1 | EA/DMAEM | 55/45 |
| A 2 | MMA/DMAEM | 55/45 |
| A 3 | BA/DMAEM | 55/45 |
| A 4 | iBA/DMAEM | 55/45 |
| B 1 | DEAEM/DMAEM | 55/45 |
| B 2 | DEAEM/DMAEM | 50/50 |
| B 3 | DEAM/DMAEM | 48/52 |
| C 1 | DEAEM | 100 |
| D 1 | EA/MMA/DMAEM | 27.5/27.5/45 |
| D 2 | EA/MMA/DMAEM | 27.5/27.5/45 |
| D 3 | " | 50/5/45 |
| D 4 | " | 45/10/45 |
| D 5 | " | 42/13/45 |
| D 6 | " | 5/50/45 |
| D 7 | " | 15/40/45 |
| D 8 | " | 10/45/45 |
| D 9 | " | 20/35/45 |
| D 10 | " | 25/30/45 |
| D 11 | " | 30/25/45 |
| E 1 | EA/DMAEM | 65/25 |
| E 2 | EA/DMAEM | 60/40 |
| E 3 | MMA/DMAEM | 70/30 |
| E 4 | " | 65/35 |
| E 5 | " | 60/40 |
| E 6 | BA/DMAEM | 60/40 |
| E 7 | BA/DMAEM | 65/35 |
| E 8 | BA/DMAEM | 70/30 |
| E 9 | BA/DMAEM | 55/45 |
| E 10 | EA/DMAPMA | 55/45 |
| E 11 | " | 60/40 |
| E 12 | " | 65/35 |
| E 13 | EA/DMAEA | 55/45 |
| E 14 | " | 60/40 |
| E 15 | " | 65/35 |
| E 16 | " | 70/30 |
| E 17 | MMA/DMAEM | 55/45 |

| List of Polymers Tested | | |
|---|---|---|
| E 18 | " | 60/40 |
| E 19 | " | 65/35 |
| E 20 | " | 70/30 |
| E 21 | BA/DMAEA | 55/45 |
| E 22 | " | 60/40 |
| E 23 | " | 65/35 |
| E 24 | " | 70/30 |
| E 25 | EA/DMAEA | 55/45 |
| F 1 | EA/MAA | 35/65 |
| F 3 | AcAM/AA | 80/20 |
| G 1 | AcAM/DMAEA | 55/45 |
| G 3 | AcAM/DMAEM | 55/45 |
| G 6 | AcAM/DMAEM-MSQ | 68/32 |
| H 1 | $NaAl_2O_3$ | 48 |
| H 5 | Aniline/Formaldehyde | 44/56 |

| Glossary of Abbreviations | |
|---|---|
| MAA = | Methacrylic Acid |
| AcAm = | Acrylamide |
| AA = | Acrylic Acid |
| DMAEM-MSQ = | Dimethylaminoethyl methacrylate-methyl sulfate quat |
| $NaAl_2O_3$ | Sodium Aluminate |
| BA = | Butyl acrylate |
| DMAEM = | Dimethylaminoethylmethacrylate |
| EA = | Ethyl acrylate |
| IBA = | Isobutylacrylate |
| DMAPMA = | Dimethylaminopropyl methacrylate |
| MMA = | Methyl methacrylate |
| DMAEA = | Dimethylaminoethyl acrylate |
| DEAEM = | Diethylaminoethyl methacrylate |

WATER CLARIFICATION TESTS INDUCED AIR FLOTATION TEST

The induced air flotation test differs from other tests in the equipment being used and the amount of agitation. This test was designed for use where air induced flotation devices are providing the water clarification.

Fresh samples were obtained with each series of TESTS. 1% coagulant solutions were accurately made up so that concentrations could be effectively controlled.

2500 ml of water to be clarified was dosed with 1% coagulant solution after one minute of mixing, notes were made of the foam, the oil on the surface, the amount of overflow and the floc on the surface of the sample. Water was withdrawn from the bottom of the mixture and the oil content and the clarity of the water were noted.

As with all the tests, the polymer was compared against the product that was being used to clarify the water sampled commercially.

If the times on the above test did not reflect what was occurring in the system, adjustments were made to simulate the system.

BOTTLE TEST PROCEDURE

Several tests were used to evaluate the new cationic WELS, (i.e. water external latexes) these are described below.

A. Ratio Test
1. Collected a chemical free sample of producing water containing the dispersed oil.
2. Filled 6 bottles to the 100 ml mark with freshly collected sample and inverted several times.
3. By means of an Eppendorf syringe, pipetted 0.05 (5ppm), 0.10 (10ppm), 0.15 (15ppm), 0.20 (20ppm), 0.50 (50ppm) ml of the 1% test solution to the dispersion in the bottles (Bottle 6 is a blank).
4. Capped the bottles and agitated 30-50 slow rolls. Set bottles on flat surface and observe water clarity and flocculation. Record observations on bottle test sheet.
   a. A numerical system of 1 through 10 was used to rate the bottles. A (1) represents the best in water quality, speed and degree of coagulation and (10) the worst.
5. Agitated bottles again. This time gave the bottles 50-100 vigorous rolls or shakes. Set bottles on flat surface and again observed and recorded on the bottle test sheet the clarity of the water and the speed and degree of coagulation.

B. Elimination Test
1. From the Ratio Test Results selected a chemical ratio that showed the first signs of clarification but did not treat completely. (This ratio was used to evaluate chemicals included on the Elimination Test.)
2. Obtained fresh fluid sample from same point as sample for Ratio Test was obtained. Followed the same procedure as in the Ratio Test except that the various formulae were injected at the chemical ratio rather than one formula at several ratios.
3 Observed results and recorded on the bottle test sheet.
4. Selected the best three chemicals for further evaluation in the Confirmation Test.

C. Confirmation Test
The Confirmation Test was run similarly to the Ratio and the Elimination Tests except that only the three best formulas selected from the Elimination Test were used. The test was run on a fresh sample using two ratios below and one ratio above the level at which the Elimination Test was run. The coagulant or flocculant giving the cleanest water, the tightest and fastest coagulation, and widest treating range was selected.

TESTS

Liquid/liquid separation testing procedures were conducted on a number of different types of water systems.

These includes saline and non-saline waters, well waters, and the like. Included in the test samples are clay sands. Some included naphthenic acid, or biomass, etc.

The testing procedures described above were utilized. The tests are reported below.

In each set of tests, the first test reported is labelled Standard (STD). The Standard was the chemical being used to treat that water on a commercial basis. That chemical was chosen as a standard because it was assumed that the user selected it as the optimal chemical for treatment desired.

TEST I

INDUCED AIR FLOTATION (WEMCO)

SAMPLE 1

The water used in this test was produced via a steamflood oilfield application. The turbidity was measured using a portable phototester with a measurement of error of three units. As can be seen in the elimination test, several chemicals performed very well when compared to the standard. Although not all of the emulsion polymers outperformed the standard, it is known that varying the chemistry influences the efficiency of the resulting polymer to clarify wastewater. The confirmation test shows that the polymers A1 and E2 are nearly 40% more efficient than the standard at lower dosages.

| | Elimination Test | | |
|---|---|---|---|
| Code | ppm Used | ppm Active | Water Turbidity |
| Std (G1) | 2 | 0.66 | 96 |
| G3 | 2 | 0.56 | 95 |
| D2 | 2 | 0.8 | 79 |
| A1 | 4 | 0.8 | 95 |
| E1 | 4 | 0.8 | 84 |
| E2 | 4 | 0.8 | 92 |
| E5 | 4 | 0.8 | 93 |
| A2 | 4 | 0.8 | 83 |
| A3 | 4 | 0.8 | 74 |
| E25 | 4 | 0.8 | 74 |

| Confirmation Test | | | |
|---|---|---|---|
| G1 | 2 | 0.66 | 90 |
| A1 | 2 | 0.4 | 87 |
| E2 | 2 | 0.4 | 85 |

TEST II

INDUCED AIR FLOATATION (WEMCO)

SAMPLE 2

The standard chemical treatment of the produced water at this oilfield consists of a dual program at high dosages. Using the emulsion polymers described here, the dosages were reduced by 67% and the active ppm reduced by 85% giving the same water quality.

| Code | ppm Used | ppm Active | Water | Floc | Water Turbidity |
|---|---|---|---|---|---|
| Std (H4/F3) | 25/4 | 12/1.4 | 2 | 1 | 76 |
| A1 | 10 | 2 | 2+ | 2 | 74 |
| E25 | 10 | 2 | 1− | 2 | 72 |
| E25 | 10 | 2 | 2 | 2 | 70 |
| E26 | 10 | 2 | 2 | 2 | 69 |
| E28 | 10 | 2 | 2 | 2 | 65 |

TEST III

IAF TEST (WEMCO)

SAMPLE 3

The water used in this test was from an offshore oil producing platform using primary and secondary oil recovery methods (gas lift and/or waterflooding techniques). The standard was optimized by the ratio test and compared to the emulsion polymers as shown in the elimination test. At the same dosage, the active ppm was lowered by 26% and improved the water quality by 15%.

| Ratio Test Code | ppm used | ppm Act | Water | Floc |
|---|---|---|---|---|
| G3 | 1 | 0.3 | 4 | 3 |
| " | 2 | 0.6 | 2 | 2− |
| " | 3 | 0.9 | 1 | 2 |

| Elimination Test | | | | |
|---|---|---|---|---|
| G3 (Std) | 2 | 0.54 | 2− | 2− |
| F1 | 2 | 0.40 | 3 | 4 |
| B3 | 2 | 0.40 | 2+ | 2+ |
| D1 | 2 | 0.40 | 2− | 2− |
| G3 (Std) | 6 | 1.62 | 2 | 2 |
| D1 | 6 | 1.20 | 1− | 2+ |
| B3 | 6 | 1.20 | 1− | 1 |
| A2 | 6 | 1.20 | 2 | 2+ |

TEST IV

BOTTLES TESTS

SAMPLE 4

This is a gas field in the Gulf of Mexico that produces a slightly color condensate having an API gravity of 45-8. In grading chemical for water treatment, the water clarity is given the most weight. The floc that forms is difficult to read due to the nearly water white condensate. As can be seen from the elimination test, the dosage (as active ppm) was lowered by 25% and with 15% better water quality.

| Ratio Test Code | ppm used | ppm Active | Water | Floc |
|---|---|---|---|---|
| F2 (Std) | 4 | 0.6 | 6 | 7 |
| F2 | 8 | 1.2 | 4 | 7 |
| F2 | 12 | 1.8 | 2 | 4 |

| Elimination Test | | | | |
|---|---|---|---|---|
| F2 (Std) | 12 | 1.8 | 2 | 4 |
| A1 | 12 | 2.4 | 1 | 7 |
| A3 | 12 | 2.4 | 1 | 7 |
| C1 | 12 | 2.4 | 1 | 6 |
| E6 | 12 | 2.4 | 1− | 6 |
| E10 | 12 | 2.4 | 2 | 9 |
| E16 | 12 | 2.4 | 2 | 9 |
| F1 | 12 | 2.4 | 3 | 4 |
| G3 | 12 | 2.4 | 1 | 2 |
| G4 | 12 | 2.4 | 2 | 3 |
| G6 | 12 | 2.4 | 2+ | 3 |

TEST V

BOTTLE TESTS

SAMPLE 5

The standard chemical used in the ratio test had an anionic charge opposite of the emulsion polymers described here. As can be seen in the elimination test, the amine emulsion polymers clearly outperformed the standard chemical on oilfield produced waters.

| Ratio Test Code | ppm Used | ppm Active | Water | Floc |
|---|---|---|---|---|
| F1 | 5 | 1 | 1 | 3 |
| F1 | 10 | 2 | 3 | 4 |
| F1 | 15 | 3 | 5 | 6 |
| F1 | 20 | 4 | 7 | 8 |
| F1 | 25 | 5 | 7 | 8 |
| F1 | 35 | 7 | 7 | 8 |

| Elimination Test | | | | |
|---|---|---|---|---|
| F1 | 15 | 3 | 5 | 6 |
| A1 | 16 | 3 | 2 | 4 |
| E1 | 15 | 3 | 1 | 2 |
| A2 | 15 | 3 | 2 | 3 |

-continued

| | Elimination Test | | | |
|---|---|---|---|---|
| A3 | 15 | 3 | 4 | 3 |
| E9 | 15 | 3 | 1 | 2 |

TEST VI

BOTTLE TESTS

SAMPLE 6

The emulsion polymers were tested on oilfield produced waters. The clarity of the water and the quality of the resulting floc was used for measuring the best chemical. As the table shows, the polymers described here had better efficiency than the standard by more than 50%.

| Ratio Test Code | ppm Used | ppm Active | Water | Floc |
|---|---|---|---|---|
| J1 (Std) | 2.5 | 1 | 3 | 3 |
| J1 | 5.0 | 2 | 4 | 5 |
| J1 | 7.5 | 3 | 5 | 4+ |
| J1 | 10.0 | 4 | 6 | 4 O.T. |
| J1 | 12.5 | 5 | 7 | 5 O.T. |
| J1 | 15.0 | 6 | 8 | 6 O.T. |

O.T. = Overtreated

| | Elimination Test | | | |
|---|---|---|---|---|
| G3 | 5 | 1.5 | 2 | 2 |
| A1 | 5 | 1.0 | 2 | 2+ |
| E10 | 5 | 1.0 | 2 | 2 |
| E17 | 5 | 1.0 | 2− | 2− |
| E19 | 5 | 1.0 | 2 | 2− |
| E20 | 5 | 1.0 | 3 | 3 |
| J1 (Std) | 5.0 | 2.0 | 4 | 3− |
| F1 | 5.0 | 1.0 | 7 | 8 |

We claim:

1. A method for clarifying oil-in-water dispersions by liquid/liquid separation comprising dosing the water to be clarified with a copolymer produced by oil-in-water emulsion polymerization of only hydrophobic monomers where at least one hydrophobic monomer is an amine containing monomer present in the polymer at at least 40 mole percent of total monomer which monomer is hydrophobic when the amine is neutral and hydrophilic when the amine is salified at a pH below about 8, adjusting the pH of the water to be clarified, as required, to a pH of 8 or below, and then coalescing the oil dispersion to form a separate oily liquid which is then separated from the water.

2. The method of claim 1 for clarifying the oil-in-water dispersion comprising directly dosing the water to be clarified with the oil-in-water emulsion containing the copolymer having at least one of an hydrophobic monomer which contains the amine.

3. A method for clarifying an oil-in-water dispersion comprising dosing the oil-in-water dispersion to be clarified, at a pH below about 8, with an oil-in-water polymer emulsion produced by the oil-in-water emulsion polymerization of only hydrophobic monomers where at least one hydrophobic monomer is an amine containing monomer present in the polymer at at least 40 mole percent of total monomer which is hydrophobic when the amine is neutral and hydrophilic when the amine is salified, allowing the oil dispersion to coalesce, and then separating a liquid oil from the surface of the clarified water.

4. A method for clarifying oily water comprising dosing the water to be clarified, at a pH below about 8, with an oil-in-water polymer emulsion produced by the oil-in-water emulsion polymerization only a hydrophobic monomer which contains an amine, said amine being hydrophobic when neutral and hydrophilic when salified, then coalescing the oily water and separating an oily liquid from the surface of the water being clarified.

5. The method of claim 4 wherein the polymer of the oil-in-water emulsion has a molecular weight of at lest 2,000,000.

6. The method of claim 1,3,4 or claim 5 wherein the polymer produced by the oil-in-water emulsion polymerization has an average particle size within the range of 0.05 to 5.0 microns; and a pH of the polymer containing emulsion is greater than 8.

7. A method for resolving an oil-in-water emulsion comprising dosing an oil-in-water emulsion with at least 0.5 ppm of an emulsion breaker, an emulsion breaker being an oil-in-water emulsion formed by the emulsion polymerization of at least one of an hydrophobic amine containing monomer selected from the group consisting of Dimethylaminoethylmethacrylate
Diethylaminoethylmethacrylate
Dimethylaminoethylacrylate
Diethylaminoethylacrylate
Dimethylaminopropylmethacrylate
Dimethylaminopropylacrylamide
Dimethylaminoethylacrylamide
Diethylaminoethylacrylamide
N,N-Diallylcyclohexylamine
Diallylmethylamine
Dimethylaminoethylmethacrylamide
Diethylaminoethylmethacrylamide present in the polymer at at least 40 mole percent of total monomer and optionally a hydrophobic monomer from the group consisting of ethyl acrylate, methyl methacrylate, butyl acrylate, isobutyl acrylate, stearyl methacrylate, lauryl acrylate, and styrene, then adjusting the pH of the oil-in-water emulsion to a pH below about 8, coalescing the oil particles in the oil-in-water emulsion, and resolving the emulsion.

8. A method of clarifying oil-in-water dispersions by liquid/liquid separation which comprises adding to said dispersions an effective clarifying amount of a copolymer containing from about 40 mole percent to about 65 mole percent of at least one amine containing hydrophobic monomer and also contains from 60 mole percent to about 35 mole percent of a non-amine containing hydrophobic monomer, further provided that the copolymer is originally contained in an oil-in-water emulsion latex having an average particle size ranging from about 0.05 to 5.0 microns, adjusting the pH of the oil-in-water dispersions to below about 8.0 or below, and coalescing the emulsion, separating the oil phase from the water phase, thereby clarifying the oil-in-water dispersions.

9. The method of claim 8 wherein the copolymer contained in the oil-in-water emulsion is first added to water to form a solution polymer prior to addition to the oil-in-water dispersions to be clarified.

10. The method of claim 8 wherein the copolymer is added to the oil-in-water dispersions in the form of an oil-in-water emulsion containing said copolymer.

11. The method of claim 8 wherein the copolymer contains at least one amine containing hydrophobic monomer chosen from the group consisting of:
Dimethylaminoethylmethacrylate
Diethylaminoethylmethacrylate
Dimethylaminoethylacrylate
Diethylaminoethylacrylate
Dimethylaminopropylmethacrylate
Dimethylaminopropylacrylamide
Dimethylaminoethylacrylamide
Diethylaminoethylacrylamide
N,N-Diallylcyclohexylamine
Diallylmethylamine
Dimethylaminoethylmethacrylamide
Diethylaminoethylmethacrylamide
and at least one non amine containing hydrophobic monomer chosen from the group consisting of:
ethyl acrylate
methyl methacrylate
butyl acrylate
lauryl acrylate
stearyl methacrylate
styrene
isobutyl acrylate.

* * * * *